Jan. 31, 1967  A. T. EDWARDS  3,301,287
SIGN ROUTING APPARATUS
Filed Dec. 9, 1963  3 Sheets-Sheet 3
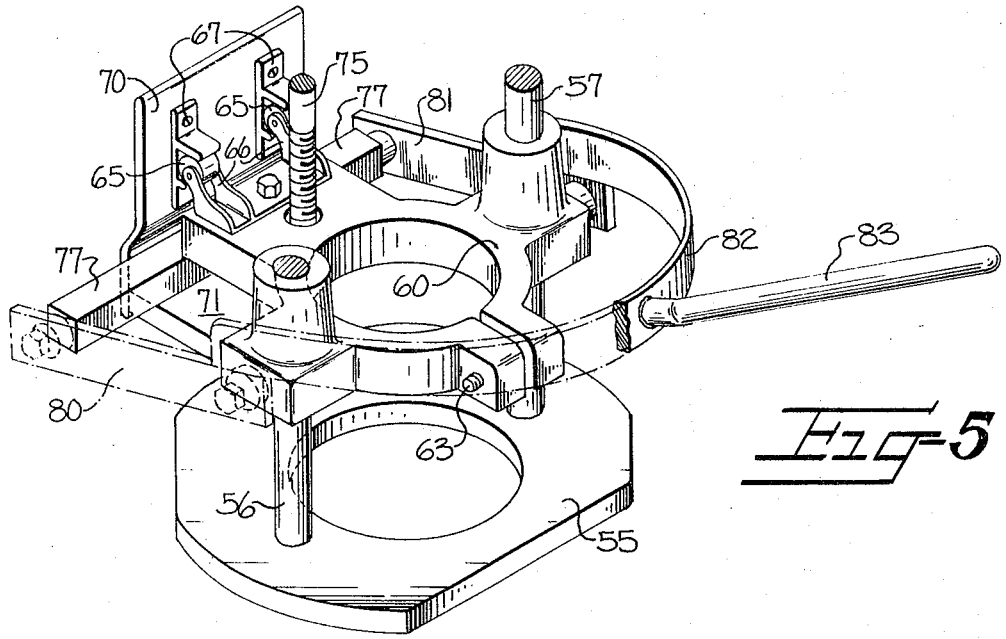
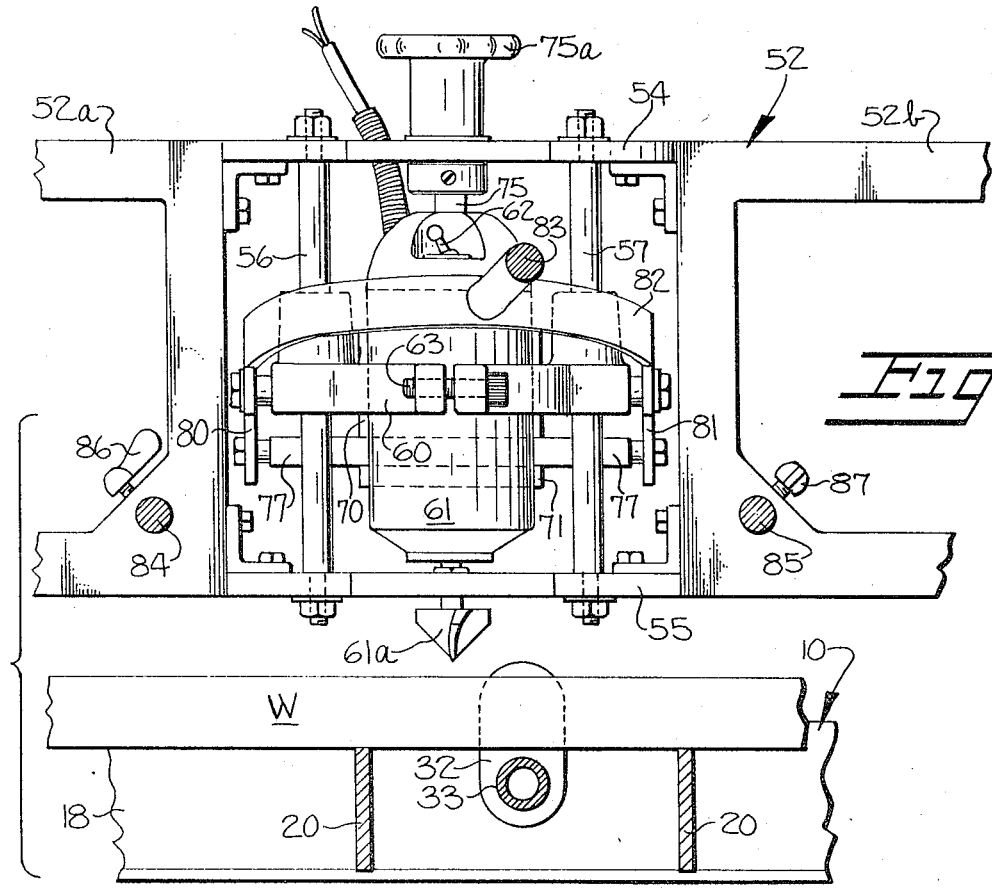

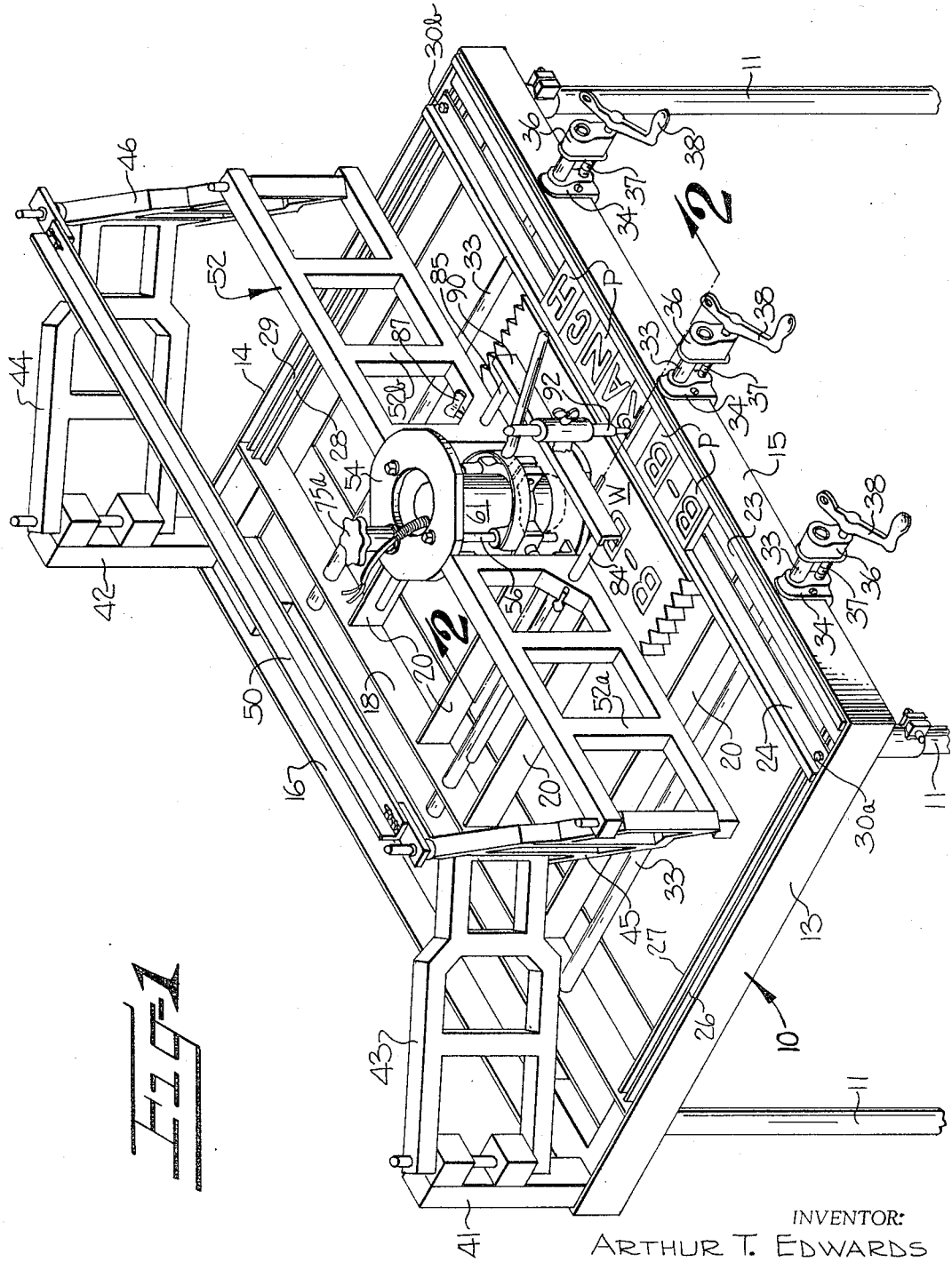

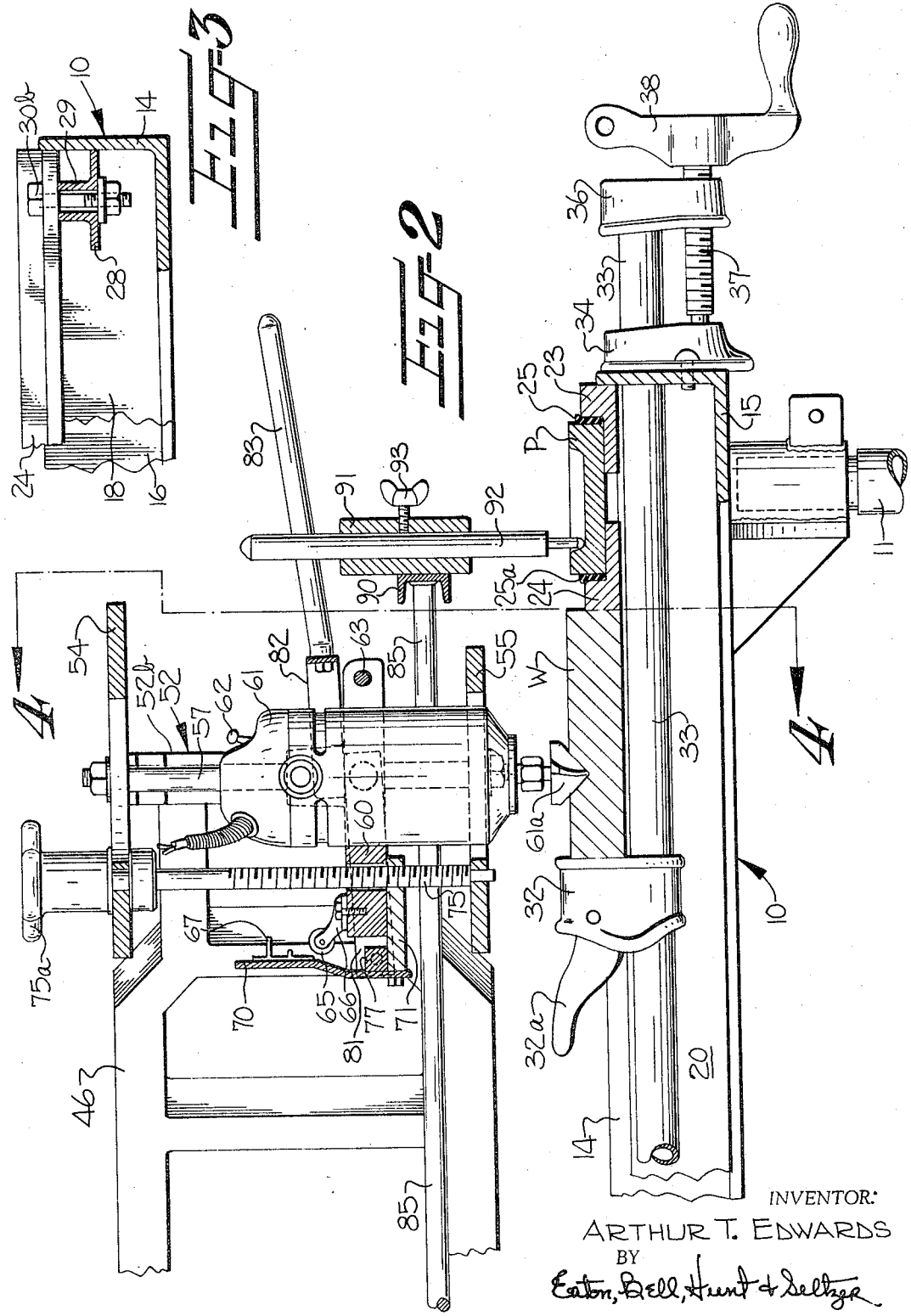

United States Patent Office 3,301,287
Patented Jan. 31, 1967

3,301,287
SIGN ROUTING APPARATUS
Arthur T. Edwards, Salisbury, N.C., assignor to Rite-A-Sign, Inc., Rowan, N.C., a corporation of North Carolina
Filed Dec. 9, 1963, Ser. No. 328,929
9 Claims. (Cl. 144—144)

This invention relates generally to a sign routing or cutting apparatus which is operable to reproduce letters, numerals and/or symbols in a workpiece, such as a board, from a predetermined arrangement of pattern or template blocks having the letters, numerals and/or symbols formed therein. More particularly, the present apparatus is provided with a rotating cutting tool that is supported for easy straight line and arcuate movement in a horizontal plane and a stylus that is adjustably supported relative to the rotating cutting tool and is movable along the pattern letters, numerals and/or symbols to impart like movement to the roating cutting tool.

It is a primary object of the present invention to provide an improved sign routing apparatus of the type described wherein the rotating cutting tool is supported for vertical movement into and out of engagement with the workpiece independently of the pattern tracing stylus, and wherein the rotating cutting tool is always maintained in a position directly behind and in alinement with the stylus so that the pattern blocks can be alined directly in front of the location on the workpiece where the letters, numerals and/or symbols are to be cut.

It is another object of the present invention to provide a sign routing apparatus of the type described wherein the cutting tool and stylus are carried by a parallelogram linkage which supports the same for easy swinging movement in a horizontal plane over an open-frame table where the workpiece and pattern are held at substantially the same level, the parallelogram linkage including a support beam that is pivotally connected at opposite ends to the forward ends of pivotally interconnected pairs of arms which are connected together at their points of pivotal interconnection by a connector bar. The support beam, connector bar and arms form a pair of parallelograms and the support beam and arms have substantial vertical height to provide sufficient support for maintaining the support beam at a fixed distance above the workpiece and the open-frame table upon which the workpiece is supported.

It is another object of the present invention to provide a sign routing apparatus of the type described having a table-top support that includes means for quickly and easily clampingly engaging the pattern and the workpiece in proper alinement thereon, and in which the cutting tool and stylus are supported on the parallelogram linkage for independent vertical movement into and out of engagement with the respective workpiece and pattern.

Some of the objects of the invention having been stated, other objects will appear as the description proceeds, when taken in connection with the accompanying drawings, in which—

FIGURE 1 is an isometric view of the routing apparatus showing the manner in which the routing tool and the stylus are supported for swinging movement when copying an arrangement of letters and symbols to form a sign in a workpiece;

FIGURE 2 is an enlarged fragmentary vertical sectional view taken substantially along the line 2—2 in FIGURE 1;

FIGURE 3 is an enlarged vertical sectional view of a detail of the open-frame table of the apparatus taken substantially along the line 3—3 in FIGURE 1;

FIGURE 4 is a vertical sectional view taken substantially along the line 4—4 in FIGURE 2, and showing the rotating cutting tool in a raised position, out of engagement with the workpiece; and FIGURE 5 is an isometric view of the cutting tool support bracket removed from the apparatus, with the cutting tool removed therefrom, and illustrating the manner in which the support bracket is supported for vertical movement, with the bracket being resiliently supported in its uppermost position.

Referring particularly to FIGURE 1, the sign routing apparatus includes a frame having a rectangular open-frame pattern and workpiece supporting table broadly indicated at 10. The table 10 is supported on the upper ends of removable legs 11, the lower ends of which rest upon the floor, not shown, to support the table 10 in a horizontal position. The table 10 includes angle iron end frame members 13 and 14 which are connected at their respective front and rear ends by angle iron frame members 15 and 16.

The open-frame table upon which the workpiece and the pattern is supported includes a longitudinally extending angle iron member 18, opposite ends of which are suitably connected to the end frame members 13 and 14, and a plurality of spaced apart, parallel, transversely extending guide plate members 20 which are suitably connected at opposite ends to the longitudinal member 18 and the front frame member 15. The upper edges of guide plate members 20 are disposed slightly below the upper edges of the table frame members 13–16 and the longitudinal member 18.

Any predetermined arrangement of pattern blocks, indicated at P, may be laid on the horizontal flanges of respective front and rear support rails 23 and 24 (FIGURE 2) and strips of resilient material 25 and 25a are preferably placed between the ends of the pattern blocks P and the vertical flanges of the rails 23 and 24, for purposes to be presently described. The rail 23 is secured on the table 10 with its front edge in engagement with the inner surface of the vertical leg of the front angle iron frame member 15. The rail 24 is supported at opposite ends for sliding movement on sets of rail members 26, 27 and 28, 29. As shown in FIGURE 1, the spaced apart rail members 26, 27 and 28, 29 are suitably secured at their rear ends to the longitudinal member 18 and at their front ends to the front angle iron frame member 15.

After the proper arrangement of pattern blocks P are placed between the rails 23, 24, suitable bolts 30a and 30b (FIGURE 1) may be tightened to hold the rail 24 in position. Referring to FIGURE 3, it will be noted that the bolt 30b penetrates the rail 24 and passes down between the rails 28 and 29 where its lower end is provided with a suitable washer and nut. The resilient strips 25 and 25a are positioned at each end of the pattern blocks P to take care of any variation in size of the pattern blocks and to insure that all of the pattern blocks will be securely gripped between the rails 23 and 24 when the rail 24 is clampingly moved to its forwardmost position, in a manner to be presently described.

A suitable workpiece W, such as a board, is supported on the upper surface of guide plate members 20 with its front edge against the rear edge of the rail 24 (FIGURE 2) and the workpiece W is then longitudinally alined with the pattern blocks P. A work clamp 32 (FIGURE 2) is supported for longitudinal movement on each of three clamping rods 33. The rearmost ends of each clamping rod 33 slidably penetrate the longitudinal member 18 and the forward portions are each mounted for sliding movement in a support bracket 34 which is secured to the front of the angle iron front frame member 15. The forward ends of the rods 33 have downwardly depending cap members 36 secured thereto and the lower ends are threadably penetrated by the medial portions of adjusting screws 37. The forward ends of the adjusting screws 37 are provided with crank handles 38 and the inner ends of the adjusting screws 37 are suitably secured for rotation in the lower portions of the brackets 34.

After the workpiece W is positioned as shown in FIGURES 1 and 2, the clamp member 32 is moved forwardly on the clamping rod 33 until it engages the rear edge of the workpiece W, as shown in FIGURE 2. A locking lever 32a is then moved to lock the work clamp 32 in position on the rod 33. The crank handle 38 is then rotated to draw the clamping rod 33 forwardly and clamp together the workpiece W, the rail members 23, 24, and the pattern blocks P. At this point, the nuts 30a and 30b may be tightened to hold the rail 24 in clamped position so that the pattern blocks P will not be released when the workpiece W is released.

The cutting tool and the tracing stylus are supported for free swinging movement in a horizontal plane on a support frame which includes a pair of upstanding corner support posts 41 and 42, the lower ends of which are suitably secured at the rear corners of the table 10. In this particular instance, the support posts 41 and 42 have outwardly extending bracing legs which extend along and are suitably connected to the angle iron frame members 13, 14 and 16. A pair of cast, open-frame arms 43 and 44 are pivotally supported at their rear ends to the respective support posts 41 and 42 and their forward ends are pivotally connected to the rear ends of corresponding arms 45 and 46.

A cross link 50 is connected at opposite ends at the pivotal connection between the arms 43, 45 and 44, 46 and a built-up front support beam 52 is pivotally connected at opposite ends to the forward ends of the arms 45 and 46. The cross link 50 and the support beam 52 insure that the pair of arms 43, 45 move with the pair of arms 44, 46 when any movement is imparted to the front support beam 52. The arms 43, 44, 45 and 46 may be economically produced because they are identical and can be cast from a single mold and they are relatively wide, in a vertical direction, so that they will rigidly support a great amount of weight. It will be noted in FIGURE 1 that the arms 43, 45 and 44, 46, the cross link 50 and the support beam 52 define a pair of adjacent parallelograms which may be easily swung above the table 10 and which will always maintain the support beam 52 in parallel relationship with the front and rear frame members 15 and 16 of the table 10.

In the present instance, the support beam 52 is formed of identical and longitudinally alined beam sections 52a and 52b which are pivotally connected at their distal ends to the front ends of the arms 45, 46 and at their inner ends by upper and lower plate members 54 and 55 (FIGURE 4). A pair of vertical guide ports 56 and 57 are suitably secured at their upper and lower ends in the respective plate members 54, 55 and guidably support for vertical movement thereon a cutting tool support bracket 60 (FIGURE 5) having a centrally disposed opening which is adapted to receive a router 61.

The router 61 may be of any suitable type and is usually provided with an electrically driven motor and a control switch 62. The router 61 is preferably supported in a vertical position and has an interchangeable cutter 61a supported on its lower end. The front portion of the support bracket 60 is split and has forwardly extending ears which may be tightened together by a set screw 63 to clamp the router 61 therein.

The cutting tool supporting bracket 60 has a rearwardly extending portion on which a pair of latching rollers 65 are supported by a bracket 66 (FIGURE 5). As shown in FIGURE 2, the latching rollers 65 extend outwardly beyond the rear edge of the rear portion of the support bracket 60 and when the support bracket 60 is raised, in a manner to be presently described, the latching rollers 65 snap into position in locking clips 67, which are suitably secured to an upstanding plate 70 (FIGURE 5). The lower edge of the plate 70 is suitably connected to the rear edge of a forwardly extending adjustment platform 71 (FIGURE 2) which extends beneath the rearwardly extending portion of the support bracket 60.

The adjustment platform 71 is supported for vertical adjustment on a threaded shaft 75, the lower end of which is suitably supported for rotation in the lower plate 55 and the upper end of which is fixed against longitudinal movement in the upper plate 54 (FIGURE 2). The medial portion of the threaded shaft 75 loosely passes through the rearwardly extending portion of the bracket 60 (FIGURE 2) and the upper end of the threaded shaft 75 is provided with a handle 75a for easily rotating the same to adjust the vertical position of the plate 71, for purposes to be presently described.

The medial portion of a pivot bar 77 (FIGURES 2 and 5) is suitably connected at the juncture of the plates 70 and 71 and its opposite ends extend outwardly therefrom and have the rear ends of a pair of forwardly extending links 80 and 81 (FIGURE 5) pivotally connected thereto. The forward ends of the links 80 and 81 are pivotally connected to the cutter support bracket 60 and have the rear ends of a semi-circular cutter lifting member 82 suitably connected thereto. The semi-circular cutter lifting member 82 extends around the front of the router 61 and has the rear end of a cutter lifting handle 83 suitably connected thereto. As best shown in FIGURE 4, the rear end of the handle 83 is connected in offset relation to the semi-circular member 82 and extends outwardly therefrom at a slight angle.

A pair of horizontally disposed guide rods 84 and 85 are supported for longitudinal movement in the respective support beams 52a and 52b (FIGURES 1 and 4) and are held in adjusted position by respective lock screws 86 and 87 (FIGURE 4). The forward ends of the rods 84, 85 are connected by a stylus support bar 90 which has a vertically disposed sleeve member 91 fixed to a medial portion thereof. The sleeve 91 has a tracing point or stylus 92 supported for vertical movement therein and a locking screw 93 is threadably supported in the sleeve 91 to engage the stylus 92 when tightened (FIGURE 2). It will be noted in FIGURE 2 that the lower end of the stylus 92 is relatively sharp or pointed and the upper end is relatively blunt, so that either end of the stylus can be used, depending upon the type of embossed letters that are provided on the pattern blocks being used.

The depth that the cutter 61a can penetrate the upper surface of the workpiece W (FIGURE 2) is easily adjusted by rotating the handle 75a in the proper direction to thereby raise or lower the support plate 71. Raising or lowering the support plate 71 will in turn raise or lower the position of the support bracket 60 and router 61 supported thereby, thus changing the adjustment of the lower limit of travel of the cutter 61a when in its lowermost position as shown in FIGURE 2.

The stylus 92 is supported in direct alinement in front of the cutter 61a and is maintained in this position with any movement of the support beam 52 so that any arrangement of pattern blocks P will be duplicated on the workpiece W directly behind the corresponding pattern blocks P. Thus, the workpiece can be easily alined behind the pattern to be cut. Also, the distance between the stylus 92 and the cutter 61a may be adjusted as desired, by loosening the locking screws 86 and 87 and adjusting the rods 84, 85 so that the stylus 92 is in the proper position forwardly of the cutter 61a.

The cutter 61a is raised out of and moved down into engagement with the workpiece W independently of movement of the stylus by raising and lowering the handle 83. When the handle 83 is raised, the latching rollers 65 will engage the locking clip 67 as the support bracket 60 is raised on the guide posts 56 and 57 and the cutting tool 61 will be resiliently maintained in the uppermost position shown in FIGURE 4. When the handle 83 is lowered, the support bracket 60 will be lowered until its rear portion engages the adjustment plate 71, which will stop downward movement of the cutter 61a'.

In order to set up the apparatus for routing a sign, such as that illustrated in FIGURE 1, the pattern blocks P are first properly arranged between the clamping rails 23, 24 with the resilient strips 25, 25a at the top and bottom of the pattern blocks. Then, the workpiece W is positioned against the rear edge of the rail 24 and properly alined longitudinally for cutting the pattern in the proper location thereon, bearing in mind that the symbols on each pattern block P will be reproduced on the workpiece in alinement directly behind the pattern blocks. The clamps 32 are then moved against the rear edge of the workpiece W and the crank handles 38 rotate to move forwardly the workpiece W and clamp the pattern blocks P between the rails 23, 24. If desired, the nuts 30a and 30b may then be tightened to hold the rail 24 in position so that the workpiece W can be released and replaced by another workpiece while the pattern blocks P will remain in clamped position.

Depending upon the position of the letters to be cut into the workpiece W, the distance between the cutting tool 61a and the tracing point 92 is then adjusted by moving the tracing point 92 forwardly or rearwardly and then tightening the screws 86, 87 against the guide rods 84, 85 (FIGURE 4), after the proper adjustment is made. With the stylus positioned in one of the pattern letters, the screw 93 may be tightened and the point of the stylus moved to any portion of the letter to begin the cutting operation. Then, the handle 83 will be lower to bring the cutting tool 61a into engagement with the workpiece, as shown in FIGURE 2, with the support bracket 60 moving into engagement with the stop plate 71 to thereby limit downward movement of the cutting tool 61a.

After the point of the stylus 92 has been traced around the letter on one pattern block, the handle 83 is raised to raise the cutter 61a out of engagement with the workpiece and the screw 93 is loosened to raised the stylus 92 so that the support beam 52 can be moved to position the stylus above the letter in the next pattern block where the stylus is again lowered into engagement with the cut-out letter in the pattern block. The handle 83 will then again be lowered to bring the cutter 61a into engagement with the workpiece and the letter will then be traced by the stylus 92. If desired, the screw 93 may remain loose during the forming of the sign and the stylus 92 may be raised when moving the same from one pattern letter to the next and during the cutting operation the stylus may be manually maintained in engagement with the pattern letters.

The parallelogram frame, formed by the support arms 43, 45, 44, 46, cross link 50 and support beam 52, maintains the front support beam 52 in parallel alinement with the workpiece and the front edge of the table so that the cutting tool 61a and the stylus 92 are always maintained in alinement transversely of the table. The relative thickness of the support arms also prevents any vertical movement of the support beam 52 and insures a rigid support while allowing free and easy multi-directional movement of the cutter 61a and the stylus 92 in a horizontal plane over the table 10.

As is best seen in FIGURE 1, each arm of the parallelogram linkage has a vertical height that is greater than one-third the horizontal length thereof.

One of the main advantages of the present routing apparatus results from the fact that the cutting tool 61 is mounted for vertical movement independently of vertical movement of the stylus 92. With the cutting tool 61 mounted in an independently movable carriage, the cutting tool 61 can be maintained in a raised and inoperative position until the stylus 92 has been properly positioned in the pattern blocks. Also, since the cutting tool 61 and the stylus 92 are both supported by the parallelogram linkage, the stylus will engage the cutout letters of the pattern blocks very lightly. Thus, the stylus of the present routing apparatus is not required to support the weight of the cutting tool, as is the case in some known types of routing apparatus.

In the drawings and specification there has been set forth a preferred embodiment of the invention and, although specific terms are employed, they are used in a generic and descriptive sense only, and not for purposes of limitation, the scope of the invention being defined in the claims.

I claim:

1. A sign routing apparatus for reproducing in a workpiece embossed letters and the like from a pattern comprising:
   (a) a pattern and workpiece supporting table having means for clampingly supporting the pattern and workpiece on front portions thereof with the pattern being clampingly supported in front of the workpiece,
   (b) a rotatable cutting tool disposed in a vertical position above said table,
   (c) a carriage including a support bracket clampingly engaging said cutting tool for mounting said cutting tool on said carriage,
   (d) parallelogram linkage carried by said table and including a pair of vertical guide rods on which said support bracket of said carriage is mounted for vertical movement to support said carriage on said parallelogram linkage in a predetermined plane for movement in any direction across said table and to support said cutting tool for movement into and out of engagement with the workpiece,
   (e) a stylus, and
   (f) means operatively connected to said parallelogram linkage and adjustably supporting said stylus in front of said cutting tool for movement in a horizontal plane to vary the distance from said stylus to said cutting tool and for vertical movement of the stylus into and out of engagement with the pattern independently of movement of said cutting tool into and out of engagement with the workpiece.

2. In an apparatus according to claim 1 including cutting tool positioning linkage having a manually operable handle at one end, the opposite end of said cutting tool positioning linkage being pivotally supported on said parallelogram linkage, and a medial portion of said cutting tool positioning linkage being operatively connected to said vertically movable cutting tool support bracket, said handle being movable in a vertical plane to move said cutting tool toward and away from the workpiece.

3. In an apparatus according to claim 2 wherein said parallelogram linkage includes adjustable means for limiting the vertical movement of said support bracket and the cutting tool carried thereby, said adjustable means comprising a stop bracket supported for vertical adjustment on said parallelogram linkage and including upper and lower stop means operatively engageable with said support bracket for limiting vertical movement of said support bracket.

4. In an apparatus according to claim 3 wherein said upper stop means includes means for resiliently maintaining said support bracket in the uppermost position with said cutting tool out of engagement with the workpiece.

5. A sign routing apparatus for reproducing in a workpiece embossed letters and the like from a pattern comprising:
   (a) a pattern and workpiece supporting table having means for clampingly supporting the pattern and workpiece on front portions thereof with the pattern being clampingly supported in front of the workpiece,
   (b) a rotatable cutting tool disposed in a vertical position above said table,
   (c) a carriage supporting said cutting tool and being operable to vertically move said cutting tool into and out of engagement with the workpiece, (d) parallelogram linkage carried by said table and supporting said carriage in a predetermined horizontal plane for movement in any direction across said table,
(e) a stylus, and
(f) means operatively connected to said parallelogram linkage and adjustably supporting said stylus in front of said cutting tool for movement in a horizontal plane to vary the distance from said stylus to said cutting tool and for movement of the stylus into and out of engagement with the pattern independently of movement of said cutting tool into and out of engagement with the workpiece, said means comprising:
  (1) a vertically disposed sleeve,
  (2) a horizontally disposed bar supporting said sleeve, and
  (3) a pair of rods extending rearwardly and on opposite sides of said carriage and supporting said horizontally disposed bar on their forward end, said rods being supported for longitudinal adjustment in said parallelogram linkage.

6. A sign routing apparatus for reproducing in a workpiece embossed letters and the like from a pattern comprising:
  (a) a pattern and workpiece supporting table having means for clampingly supporting the pattern and the workpiece on front portions thereof with the pattern being clampingly supported in front of the workpiece,
  (b) a rotatable cutting tool disposed in a vertical position above said table,
  (c) a carriage supporting said cutting tool and being operable to vertically move said cutting tool into and out of engagement with the workpiece,
  (d) parallelogram linkage carried by said table and supporting said carriage in a predetermined plane for movement in any direction across said table, said parallelogram linkage comprising:
    (1) a pair of upstanding posts fixed at their lower ends on corresponding rear corners of said table,
    (2) a pair of arms pivotally connected at their rearends on said post and extending therefrom to swing above said table in a predetermined plane,
    (3) a connector beam pivotally connected at opposite ends to the forward ends of said arms whereby any swinging movement imparted to one of said arms will be imparted to the other arm, said arms defining opposite ends and said connector beams defining one side of a first swinging parallelogram movable above said table,
    (4) a pair of auxiliary arms each pivotally connected at their rear ends to the forward ends of the first-named arms, and
    (5) a support beam pivotally connected at opposite ends to the front ends of said auxiliary arms, said auxiliary arms defining opposite ends and said support beam defining one side of a second swinging parallelogram movable above said table and said carriage being supported on a medial portion of said support beam,
  (e) a stylus, and
  (f) means operatively connected to said parallelogram linkage and adjustably supporting said stylus in front of said cutting tool for movement in a horizontal plane to vary the distance from said stylus to said cutting tool and for vertical movement of the stylus into and out of engagement with the pattern independently of movement of said cutting tool into and out of engagement with the workpiece.

7. In an apparatus according to claim 6 wherein the arms of said first and second parallelograms are identical and the vertical height of each arm is greater than one-third the horizontal length thereof.

8. A sign routing apparatus for reproducing in a workpiece embossed letters and the like from a pattern comprising:
  (a) a pattern and workpiece supporting table having means for clampingly supporting the pattern and the workpiece on front portions thereof with the pattern being clampingly supported in front of the workpiece,
  (b) a rotatable cutting tool disposed in a vertical position above said table,
  (c) parallelogram linkage carried by said table and supporting said cutting tool in a predetermined horizontal plane for movement in any direction across said table, said parallelogram linkage comprising:
    (1) a pair of upstanding posts fixed at their lower ends on corresponding rear corners of said table,
    (2) a pair of arms pivotally connected at their rear ends on said posts and extending therefrom to swing above said table in a horizontal plane,
    (3) a connector beam pivotally connected at opposite ends to the forward ends of said arms whereby any swinging movement imparted to one of said arms will be imparted to the other arm, said arms defining opposite ends and said connector beam defining one side of a first swinging parallelogram movable above said table,
    (4) a pair of auxiliary arms each pivotally connected at their rear ends to the forward ends of the first-named arms,
    (5) a support beam pivotally connected at opposite ends to the front ends of said auxiliary arms, said auxiliary arms defining opposite ends and said support beam defining one side of a second swinging parallelogram movable above said table, and
    (6) a pair of spaced vertical guide rods supported on a medial portion of said support beam,
  (d) a carriage supporting said cutting tool and being operable to vertically move said cutting tool into and out of engagement with the workpiece, said carriage comprising:
    (1) a support bracket mounted for vertical movement on said guide rods and clampingly engaging said cutting tool, and
    (2) cutter tool positioning linkage having a manually operable handle at one end, the opposite end of said cutter tool positioning linkage being pivotally supported on said parallelogram linkage, and a medial portion of said cutter tool positioning linkage being operatively connected to said vertically movable cutting tool support bracket, said handle being movable in a vertical plane to move said cutter tool toward and away from the workpiece,
  (e) adjustable means carried by said support beam of said parallelogram linkage for limiting the vertical movement of said support bracket and the cutting tool carried thereby, said adjustable means comprising:
    (1) a support bracket supported for vertical adjustment on said support beam,
    (2) upper and lower stop means carried by said stop bracket and being operatively engageable with said support bracket for limiting vertical movement of said support bracket, and
    (3) said upper stop means including means for resiliently maintaining said support bracket in the uppermost position with said cutting tool out of engagement with the workpiece,
  (f) a stylus, and
  (g) means operatively connected to said parallelogram linkage and adjustably supporting said stylus in front of said cutting tool for movement in a horizontal plane to vary the distance from said stylus to said cutting tool, and for vertical movement of the stylus into and out of engagement with the pattern independently of movement of said cutting tool into and out of engagement with the workpiece.

9. In an apparatus according to claim 8 wherein said means (g) for supporting said stylus (f) for vertical and horizontal adjustment comprises:
  (1) a vertically disposed sleeve,
  (2) a horizontally disposed bar supporting said sleeve on a medial portion thereof and directly in front of said cutting tool, and
  (3) a pair of rods extending rearwardly and on opposite sides of said carriage and supporting said horizontally disposed bar on their forward ends, said rods being supported for longitudinal adjustment in said parallelogram linkage.

References Cited by the Examiner
UNITED STATES PATENTS

| | | | |
|---|---|---|---|
| 834,346 | 10/1906 | Van Acker | 90—13.2 |
| 1,237,388 | 8/1917 | Robertson et al. | 90—13.2 X |
| 1,753,206 | 4/1930 | Johnson | 90—13.2 |
| 2,495,519 | 1/1950 | Gregsa et al. | 144—144 X |

DONALD R. SCHRAN, *Primary Examiner.*